J. Tidmarsh.
App. for Shearing Horses.
N° 96,742. Patented Nov. 9, 1869.
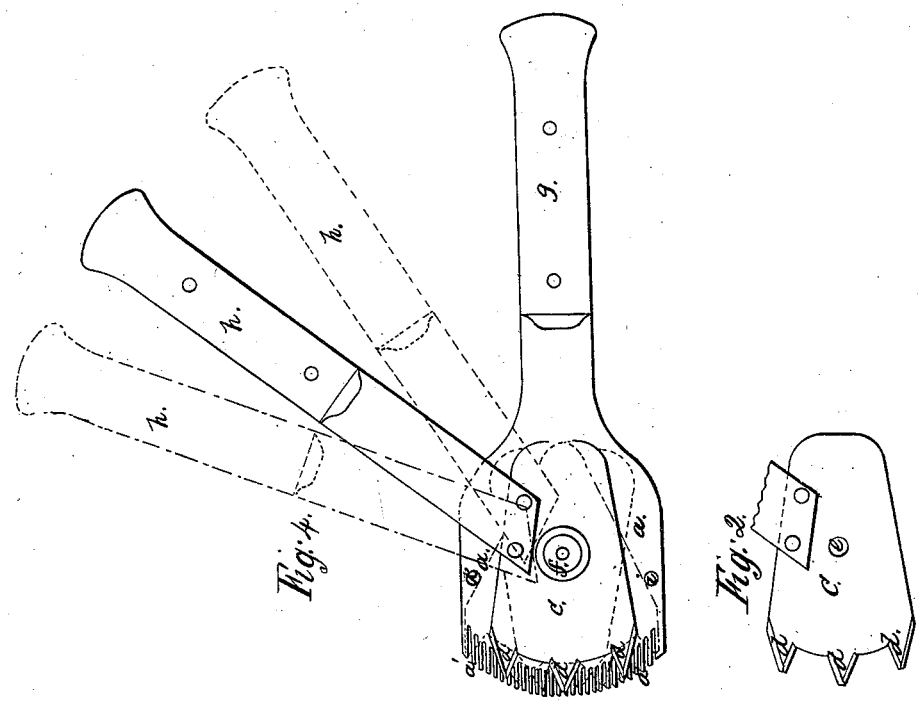
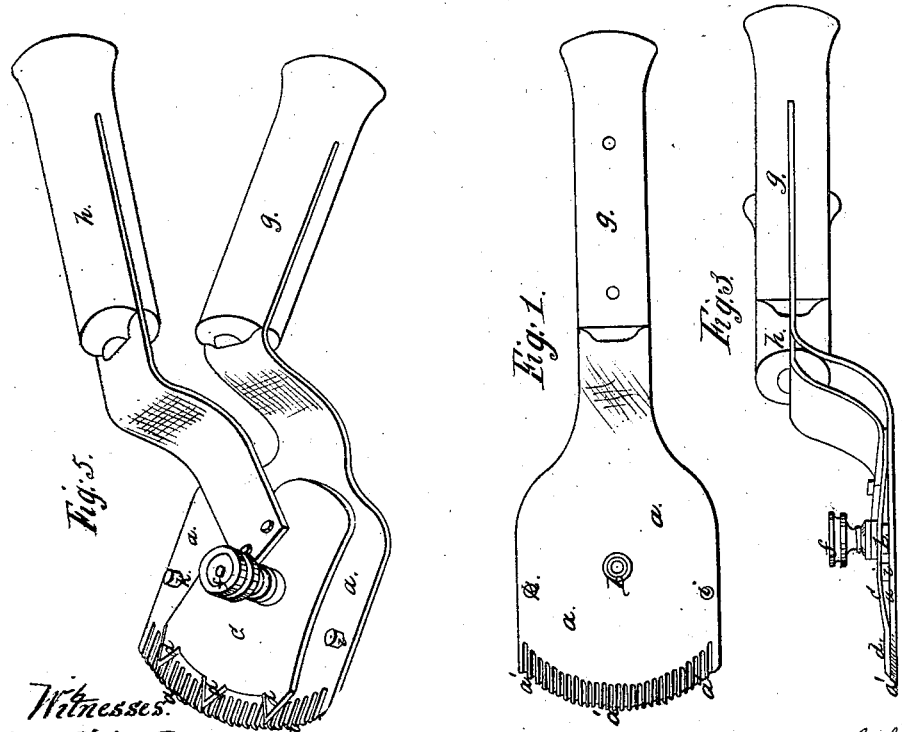
Witnesses:
Ed. Griffith Brewer.
H. L. Thomas.
Inventor.
John Tidmarsh

United States Patent Office.

JOHN TIDMARSH, OF TWICKENHAM, ENGLAND.

Letters Patent No. 96,742, dated November 9, 1869; patented in England, December 2, 1868.

IMPROVEMENT IN APPARATUS FOR CLIPPING HORSES AND OTHER ANIMALS.

The Schedule referred to in these Letters Patent and making part of the same.

*To all to whom it may concern:*

Be it known that I, JOHN TIDMARSH, of Twickenham, in the county of Middlesex, England, Watch-Maker, have invented certain new and useful "Improvements in Apparatus for Clipping or Shearing Horses and other Animals;" and I do hereby declare that the following is a full and exact description thereof, reference being had to the accompanying drawings, and to the letters of reference marked thereon.

The nature of my invention consists in the construction of apparatus for clipping or shearing horses and other animals, in the following manner:

Heretofore, modifications of apparatus for clipping and shearing have been made, some of which have the same number of teeth on the comb-plate as there are on the cutting-plate, and in some, a single cutter is used on the cutting-plate. Now, according to my invention, I form, as hereinafter more particularly described, the comb with a much greater number of teeth than the plate carrying the cutting-blades. I make the comb, as shown in the drawings hereunto annexed, in figs. 1, 4, and 5, segmental in form, and the teeth close together, and, by preference, although not necessary, the same distance existing between the top and bottom of each tooth. The plate carrying the cutting-blades or knives is also, as shown in fig. 2, segmental in shape, and is secured to the comb-plate by a nut or screw.

The blades or knives are, by preference, formed in a piece with the plate, although they may be made separately, and attached thereto. A handle on the plate carrying the cutters imparts a to-and-fro motion to them, which is regulated by a stud or studs on the comb-plate.

The cutting-blades, of which I use three, by preference, are of a triangular shape, or are made with inclined sides, and cut both ways. They do not radiate from a common centre; neither do the teeth composing the comb radiate, as that arrangement of teeth and blades is not efficient in practice; whereas, by the means adopted by me in my improved apparatus, the hair is gathered by the comb, and cut by the cutters with greater facility, and in a better and more effectual manner, than in apparatus used heretofore with the object of cutting or shearing hair or wool.

The invention, therefore, essentially consists in the employment of combs, segmental in shape, with the teeth thereof close together, and not radiating from one common centre, in combination with a plate, (to which a to-and-fro motion is imparted,) also segmental in shape, and carrying cutting-blades or teeth, by preference three, but which do not radiate from a common centre.

Figure 1, of the accompanying drawings, is a front view of the comb and plate, with handle attached, constructed according to my invention;

Figure 2 is a front view of the plate carrying the cutting-blades;

Figure 3 is a side view, and

Figure 4 is a front view of the apparatus complete; and

Figure 5 is a perspective view of the apparatus.

Similar letters of reference refer to like parts in all the figures.

$a$ is the comb-plate, and $a'$, the comb formed at the outer end thereof, and which is segmental in shape, forming a portion of the radius of a circle, the centre of which is the centre of the pin $b$ on the plate $a$.

The teeth of the comb $a'$ are parallel to one another, and are cut out of the plate $a$, as shown.

$c$ is the plate, carrying three cutting-blades, $d\ d\ d$. The edges of these blades are bevelled, to bring them to cutting-edges, so that they will cut on both sides.

This plate $c$ has an aperture, $e$, formed in it, the centre of which is the centre of the outer edge of this plate and the base of the blades $d\ d\ d$.

The plate $c$ is placed on the pin $b$, on which it is free to move, and is there secured by a thumb-screw, $f$, as shown at figs. 3, 4, and 5.

The plate $c$ is somewhat arched, curved, or bent, as shown at fig. 3, so that its top and bottom ends may rest on and press against the top and bottom of the comb-plate $a$, the screw $f$ keeping the central part close up to the base of the pin $b$.

$g$ and $h$ are handles, for holding the apparatus, and for communicating a to-and-fro motion to the plates $a$ and $c$; or the handle $g$ may be used for holding the plate $a$, and the handle $h$ for giving motion only to the plate $c$.

$i$ and $k$ are pins or studs on the plate $a$, for limiting the movement of the plate $c$ on the plate $a$.

The dotted lines in fig. 4 show the extent of the distance the plate $c$ travels over the plate $a$.

To use the apparatus, the comb $a'$ is placed in the hair of the animal, which passes down to the bottom of all the teeth in the comb. The cutting-blades $d\ d\ d$ are then caused to travel over the teeth of the comb, by communicating a to-and-fro motion to the handles $g$ and $h$, or only to the handle $h$, and so all the hair held between the teeth of the comb $a'$ is cut.

I make no claim to the employment of segmental-shaped combs, the teeth of which radiate from a common centre; neither do I claim the use of a segmental-shaped comb and segmental-shaped cutting-plate; neither do I claim simply the employment of parallel or vertical teeth, when taken separately or alone.

What I do claim as my invention, and desire to secure by Letters Patent, is—

The employment, in apparatus for clipping or shearing horses and other animals, of combs, segmental in shape, having teeth whose central lines are parallel to one another and to the line in which the instrument is moved forward when in action, in combination with a plate, (to which a to-and-fro motion is imparted,) also segmental in shape, and carrying cutting-blades or teeth, which do not radiate from a common centre, but have, when at rest, their central lines parallel to those of the teeth, all substantially as hereinbefore described, and illustrated in the accompanying drawings.

JOHN TIDMARSH.

Witnesses:
EDWD. GRIFFITH BREWER,
H. S. THOMAS.